(12) United States Patent
Somani et al.

(10) Patent No.: US 11,353,352 B2
(45) Date of Patent: Jun. 7, 2022

(54) APPARATUS AND METHODS FOR SELF-CORRECTING PRESSURE BASED MASS FLOW CONTROLLER

(71) Applicant: Flow Devices and Systems Inc., Yorba Linda, CA (US)

(72) Inventors: Bhushan Somani, Yorba Linda, CA (US); Christophe Ellec, Corona, CA (US); Eric J. Redemann, Walnut Creek, CA (US)

(73) Assignee: FLOW DEVICES AND SYSTEMS INC., Yorba Linda, CA (US)

(*) Notice: Subject to any disclaimer, the term of this patent is extended or adjusted under 35 U.S.C. 154(b) by 101 days.

(21) Appl. No.: 16/334,316

(22) PCT Filed: Sep. 19, 2017

(86) PCT No.: PCT/US2017/052338
§ 371 (c)(1),
(2) Date: Mar. 18, 2019

(87) PCT Pub. No.: WO2018/053538
PCT Pub. Date: Mar. 22, 2018

(65) Prior Publication Data
US 2019/0204128 A1    Jul. 4, 2019

Related U.S. Application Data

(60) Provisional application No. 62/396,807, filed on Sep. 19, 2016, provisional application No. 62/396,808,
(Continued)

(51) Int. Cl.
*G05D 7/06* (2006.01)
*G01F 15/02* (2006.01)
(Continued)

(52) U.S. Cl.
CPC .............. *G01F 15/028* (2013.01); *G01F 1/40* (2013.01); *G01F 1/42* (2013.01); *G01F 1/48* (2013.01);
(Continued)

(58) Field of Classification Search
CPC ..... G01F 1/40; G01F 1/42; G01F 1/48; G01F 1/50; G01F 1/692; G01F 1/88;
(Continued)

(56) References Cited

U.S. PATENT DOCUMENTS

7,658,204 B2* 2/2010 Ishida .................. G05D 7/0658
137/486
7,918,238 B2* 4/2011 Tanaka ................ G01F 25/0038
137/10
(Continued)

*Primary Examiner* — Matthew W Jellett
(74) *Attorney, Agent, or Firm* — Mahesh Law Group PC; Kumar Maheshwari (57) ABSTRACT

A self-correcting pressure-based mass flow control apparatus includes outlet pressure sensing to enable correction for non-ideal operating conditions. Further the mass flow control apparatus having a fluid pathway, a shutoff valve in the fluid pathway, a reference volume in the fluid pathway, a first pressure measuring sensor in fluid communication with the reference volume, a first temperature measuring sensor providing a temperature signal indicative of the fluid temperature within the reference volume, a proportional valve in the fluid pathway, and a second pressure measuring sensor in fluid communication with the fluid pathway.

18 Claims, 5 Drawing Sheets

Related U.S. Application Data filed on Sep. 19, 2016, provisional application No. 62/396,809, filed on Sep. 19, 2016.

(51) Int. Cl.
| | |
|---|---|
| *G01F 1/50* | (2006.01) |
| *G01F 15/14* | (2006.01) |
| *G01F 1/42* | (2006.01) |
| *G01F 15/00* | (2006.01) |
| *G01F 25/17* | (2022.01) |
| *G01F 1/40* | (2006.01) |
| *G01F 1/48* | (2006.01) |
| *G01F 1/692* | (2006.01) |
| *G01F 1/88* | (2006.01) |

(52) U.S. Cl.
CPC ................ *G01F 1/50* (2013.01); *G01F 1/692* (2013.01); *G01F 1/88* (2013.01); *G01F 15/00* (2013.01); *G01F 15/002* (2013.01); *G01F 15/005* (2013.01); *G01F 15/02* (2013.01); *G01F 15/14* (2013.01); *G01F 25/17* (2022.01); *G05D 7/0635* (2013.01); *G05D 7/0641* (2013.01); *G05D 7/0688* (2013.01); *Y10T 137/7761* (2015.04)

(58) Field of Classification Search
CPC ...... G01F 15/00; G01F 15/002; G01F 15/005; G01F 15/02; G01F 15/14; G01F 25/0038; G05D 7/0623; G05D 7/0635; G05D 7/0641; G05D 7/0647; G05D 7/0688; G05D 9/12; Y10T 137/7761

See application file for complete search history.

(56) References Cited

U.S. PATENT DOCUMENTS

| | | | |
|---|---|---|---|
| 10,031,005 B2 * | 7/2018 | Ding | .................. G01F 1/86 |
| 2014/0190579 A1 | 7/2014 | Ding et al. | |
| 2015/0212524 A1 | 7/2015 | Kehoe et al. | |
| 2016/0239026 A1 | 8/2016 | Nagase et al. | |

* cited by examiner

FIG. 5 ically different structure. They should not be taken to limit claims to the features shown therein.

APPARATUS AND METHODS FOR SELF-CORRECTING PRESSURE BASED MASS FLOW CONTROLLER

PRIORITY CLAIM TO RELATED APPLICATIONS

This application is a national stage application of PCT/US17/52338, filed on Sep. 19, 2017, which claims the benefit of U.S. Provisional Patent Application No. 62/396,807, filed Sep. 19, 2016, entitled as "Apparatus and Methods for Self-Correcting Pressure Based Mass Flow Controller", U.S. Provisional Patent Application No. 62/396,809, filed Sep. 19, 2016, entitled as "System and Methods for Reference Volume for Flow Calibration" and U.S. Provisional Patent Application No. 62/396,808, filed on Sep. 19, 2016, entitled as System, Apparatus and Methods for Variable Restriction for Flow Measurements, each of which are incorporated herein by reference in their entirety.

BACKGROUND

Various embodiments relate to fluid mass flow control apparatus that operates by modulating a fluid pressure upstream of a flow restricting orifice, nozzle, porous medium, or similar structure. Fluid as used herein is intended to encompass materials which are in a gaseous phase because of specific combinations of pressure and temperature despite whether such materials are gaseous under everyday circumstances. Thus, fluids may include water vapor or boron trichloride (BCl3), for example, along with common gaseous materials such as silane (SiH4), argon and nitrogen. The embodiments described below relate to determining the present flow conditions at a flow restriction in a fluid flow pathway to ascertain whether or not a chosen flow control algorithm is valid for those present conditions. The presently chosen flow control algorithm may be corrected or changed as appropriate.

SUMMARY

Various embodiments include a flow control system that comprises one or more sensors, a flow measurement sensor that comprises one or more sensors. A self-correcting pressure-based mass flow control apparatus may comprise a flow control portion and a flow verification portion within the same device.

Alternative embodiments relate to other features and combinations of features as may be generally recited in the claims. Embodiments described below allow parallel or serial processing of each method and/or component.

A method for controlling a mass flow control apparatus, the method includes, providing a flow path for flowing a fluid or a gas, measuring a first pressure using a first pressure sensor of the fluid or gas in the flow path downstream to a flow restrictor, activating a shutoff valve in the flow path upstream from the flow restrictor, performing a rate of decay measurement in the flow path using a reference volume which is upstream to the flow restrictor. The method further includes being responsive to the results of the rate of decay measurement, adjust a second pressure at a second pressure sensor upstream to a flow restrictor by using a proportional valve to achieve an actual flow rate that is closer to a received setpoint flow rate.

The method mentioned above further includes the rate of decay measurement allowing the flow controller to determine the actual flow rate. In various embodiments, the reference volume is downstream to shutoff valve and corresponds to the pressure at the second pressure sensor. The method further including a proportional valve to control the pressure to the flow restrictor. The flow path includes the shutoff valve, the reference volume, the proportional control valve that is configured to control the second pressure to the flow restrictor with numerous pressure transducers within the flow path. In various embodiments, the second pressure is an absolute pressure upstream of the flow restriction and the first pressure is a differential pressure across the flow restrictor. The method includes performing the rate of decay measurement in a batchwise process instead of a continuous flow process by using the rate of decay measurement from a historical measurement for further flow of fluid or gas.

Various embodiments include a mass flow controller apparatus, the apparatus that has a flow path for flowing a fluid or a gas, a first pressure sensor configured to measure a first pressure using of the fluid or gas in the flow path downstream to a flow restrictor, a shutoff valve in the flow path upstream from the flow restrictor to perform a rate of decay measurement in the flow path using a reference volume that is upstream to the flow restrictor, and a proportional valve configured to be responsive to the results of the rate of decay measurement, the proportional value configured to adjust a second pressure at a second pressure sensor upstream to a flow restrictor to achieve an actual flow rate that is closer to a received setpoint flow rate. The apparatus includes determining the actual flow rate using a rate of decay measurement. The apparatus has a reference volume that is a calibration volume. The reference volume in the apparatus is downstream to shutoff valve that corresponds to the pressure at the second pressure sensor. The apparatus has a proportional valve that is a control valve that controls the pressure to the flow restrictor.

The apparatus with the flow path comprises the shutoff valve, the reference volume, the proportional control valve that is configured to control the second pressure to the flow restrictor with numerous pressure transducers in the flow path. The apparatus with the second pressure is an absolute pressure upstream of the flow restriction and the first pressure is a differential pressure across the flow restrictor. The apparatus configured to perform the rate of decay measurement in a batchwise process instead of a continuous flow process by using the rate of decay measurement from a historical measurement for further flow of fluid or gas.

A mass flow control apparatus having a fluid pathway, a shutoff valve in the fluid pathway, a reference volume in the fluid pathway, a first pressure measuring sensor in fluid communication with the reference volume, a first temperature measuring sensor providing a temperature signal indicative of the fluid temperature within the reference volume, a proportional valve in the fluid pathway, and a second pressure measuring sensor in fluid communication with the fluid pathway.

The apparatus further including a second temperature measuring sensor providing a temperature signal indicative of the fluid temperature within the fluid pathway, a flow restriction in the fluid pathway, a third pressure measuring sensor in fluid communication with a third location in the fluid pathway, and an electronic control module receptive to a first signal from the second pressure measuring sensor, and receptive to a second signal from the third pressure measuring sensor. The apparatus having a electronic control module that includes a storage means, a control algorithm executing processor calculating a pressure ratio, and at least one communication means, the control executing processor uses the at least one communication means to send an algorithm status notification based upon comparing the pressure ratio to a predetermined value obtained from the storage means.

BRIEF DESCRIPTION OF DRAWINGS

The disclosure will become more fully understood from the following detailed description, taken in conjunction with the accompanying figures, wherein like reference numerals refer to like elements, in which.

DETAILED DESCRIPTION

This disclosure is not limited in its application to the details of construction and the arrangement of components set forth in the following description or illustrated in the drawings. The system is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting.

A representative example of a pressure-based fluid mass flow control apparatus includes a fluid pathway comprising in sequence an inlet, a proportional control valve, provisions for measuring a temperature and a pressure of a fluid contained within the fluid pathway, a flow restriction, and an outlet. Usually there is an electronic control module associated with the fluid pathway elements and together those elements and the module constitute the apparatus. The pressure and temperature sensing elements may be sized and shaped to be suitable for including them within an inlet portion of the apparatus. Mass flow controls may involve the control module receiving a set point signal indicative of the desired mass flow, determining an indicated flow, comparing the indicated flow with the set point, and using a function of that comparison to create a signal to adjust the proportional valve controlling the fluid flow. In the representative pressure-base mass flow controller, signals indicative of the temperature and pressure of a gaseous fluid are used to calculate the indicated flow rate through the fluid pathway based upon knowledge about the flow restriction. A variety of control schemes may be used for adjusting the gas flow to bring the indicated flow acceptably close to matching the desired setpoint. The control module may be separated out from the module itself whereby those functions are instead performed by other apparatus in a larger system and external to the mass flow controller.

The mass flow of gas passing through a flow restriction depends upon the differential pressure across the restriction and the density of the gas; therefore, calculation of an indicated flow through a pressure-base mass flow controller generally requires measurement of an absolute pressure. In the case of orifice and nozzle flow restrictions, when the ratio of upstream to downstream absolute pressures is greater than about two to one (2:1), the flow is often referred to as choked (the velocity through the orifice or nozzle being equal to the speed of sound in the gas), and less than about two to one (2:1) may be called sub-critical or un-choked. Mass flow in choked conditions is nearly linear with inlet pressure while significantly nonlinear in sub-critical conditions. Pressure-based fluid mass flow control apparatus may assume that the downstream absolute pressure is nominally a vacuum condition (e.g. less than one tenth of one atmosphere absolute pressure); therefore, measuring the absolute pressure upstream of the flow restriction provides sufficient information for calculating the indicated mass flow. Instances when the downstream pressure exceeds about one half the upstream pressure may result in erroneous calculation of indicated mass flow. Simple pressure-based mass flow controllers are unable to determine that a control error is occurring due to excessive downstream pressure.

One solution to the preceding problem involves having another pressure measurement sensor in a mass flow control apparatus. The second pressure sensor may be of a differential type used to directly measure the pressure drop across the flow restriction. In some embodiments, the second pressure sensor may be an absolute type used to measure the pressure downstream of the flow restrictor and the pressure drop calculated as a difference between the upstream and downstream pressures. Using a differential type sensor across the flow restriction in conjunction with an absolute type measuring the pressure downstream of the flow restriction may be utilized. The second pressure sensor may conveniently be of size and shape suitable for including it within an outlet portion of the apparatus.

The ratio of upstream to downstream pressure when flow through the orifice or nozzle flow restriction transitions between choked flow and un-choked flow is often referred to as the critical ratio. The arithmetic inverse is also sometimes called the critical ratio. The specifics of the critical ratio depend upon properties of the gas and whether the flow is considered compressible or incompressible. Minor mechanical details of the restriction opening edges may also affect the onset of empirically observed nonlinearity. The electronic control module may be provided a specific value of critical ratio for a specific gas in the particular fluid flow pathway, or a generalized choice may be made such as considering "two" a suitable critical ratio value. The electronic control module may obtain a critical ratio value derived from pressure measurements and compare that obtained value to a stored critical ratio value. When the comparison implies calculation of indicated flow rate may be inaccurate, the control module may send a notification to one or more external devices. The control module may also change the equations or parameters used to calculate the indicated flow.

A self-correcting pressure-based mass flow control apparatus may comprise a flow control portion and a flow verification portion within the same device. The flow verification portion may be upstream of the flow control portion because that arrangement makes continuous delivery of fluid to a process relatively easy even while flow verification is being performed. Such an arrangement is considered here without loss of generality. A self-correcting fluid mass flow control apparatus includes a fluid pathway comprising in sequence an inlet, a controllable shutoff valve, provisions for measuring a first temperature and a first pressure of a fluid contained within a reference volume of the fluid pathway, a proportional control valve, provisions for measuring a second temperature and a second pressure of the fluid contained within the fluid pathway, a flow restriction, provisions for measuring a third pressure of the fluid contained within the fluid pathway, and an outlet. Various other permutations of the above sequence may be possible. There may be an electronic control module associated with the fluid pathway elements and together those elements and the module constitute the apparatus. The pressure and temperature sensing elements may be of a size and a shape suitable for inclusion within the general dimensions of the apparatus. For example, a first pressure sensor may be fit within the inlet portion, a second pressure sensor may fit within the reference volume, and a third pressure sensor may fit within an outlet portion.

In the self-correcting pressure-base mass flow control apparatus, mass flow control involves the control module receiving a set point signal indicative of the desired mass flow, determining an indicated flow using signals from the second pressure and the second temperature sensors, comparing the indicated flow with the set point, and using a function of that comparison to create a signal to adjust the proportional valve controlling the fluid flow. The flow control portion may use a signal from the third pressure sensor to determine if the indicated flow rate may be inaccurate. How possible inaccuracy may be handled is discussed further below. Flow verification involves closing the shutoff valve to isolate the fluid pathway from the inlet while controlled mass flow continues through the outlet, making repeated measurements of the first temperature and the first pressure of the fluid contained within the reference volume of the fluid pathway for a period of time, opening the shutoff valve to re-establish fluid pathway connection to the inlet, calculating a verified flow signal using pressure-temperature-volume methods, and providing the verified flow signal to a correction supervision function.

Self-correction may be initiated in response to a request received from an external system or initiated by the flow control portion when a possibility of inaccuracy is detected. In either situation, a flow verification is performed to obtain a current verified flow signal while the setpoint remains constant and the corresponding indicated flow rate is also obtained. The indicated flow rate is then compared with the verified flow signal. The verified flow signal will not be impacted by variations in downstream pressure and is considered more accurate than the indicated flow rate. Stored coefficients and device configuration information used to calculate the indicated flow rate may be changed by the correction supervisor function within the control module, reported to an external system, or otherwise managed.

A plurality of self-correcting mass flow controllers may be used with a plurality of gas species fed to a plurality of vacuum chambers for processing semiconductor devices within a single large apparatus often referred to as a "tool." A group ("pallet") of mass flow controllers allow the simultaneous combination of several different gases into a single manifold which feeds a gas distribution structure ("showerhead") inside a vacuum chamber. Insufficient conductance in the manifold plumbing may result in the downstream pressure, of a particular group of mass flow controllers, becoming too high to maintain choked flow conditions within one or more mass flow controllers within the group. The pressure within the manifold may be monitored and a corresponding signal provided to all mass flow controllers within the group as an alternative to each mass flow controller having a separate third pressure sensor. Individual mass flow controller self-correction may then proceed based upon the shared third pressure sensor signal or according to commands emanating from the tool master control (a control system external to the control module of each mass flow controller).

Figure 1:
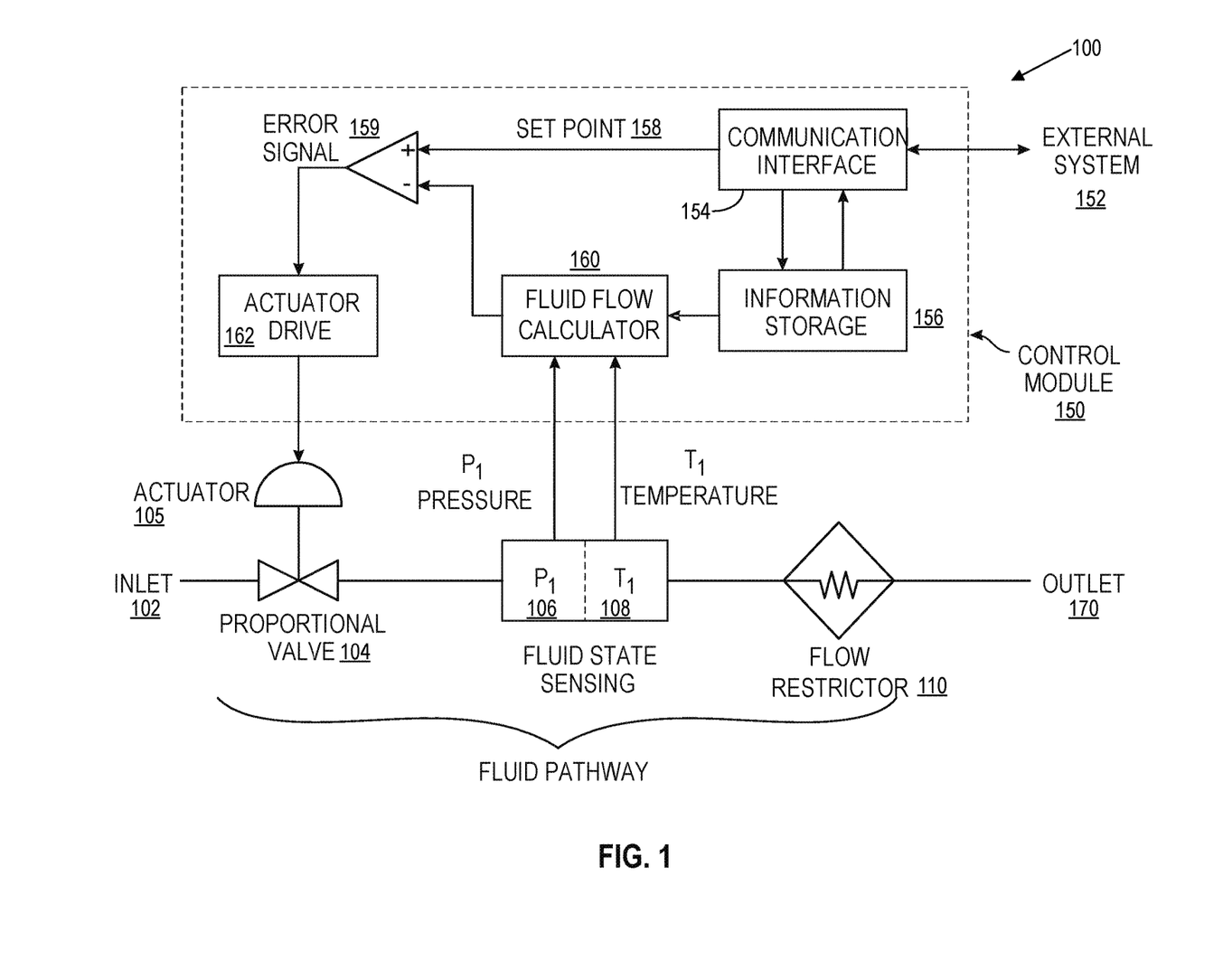
FIG. 1 is a schematic diagram of a flow control system, according to an exemplary embodiment.

Referring to FIG. 1, FIG. 1 is a representative example of a pressure-based fluid mass flow control apparatus 100 includes a fluid pathway 101 comprising in sequence an inlet 102, a proportional control valve 104, an actuator drive 105, a pressure sensor 106, a temperature sensor 108, a control module 150, an outlet 170 and a chamber 190.

The apparatus 100 may be configured to control the flow of fluids or gases based on the set point received from the external system 152. The control module 150 may control the fluid pathway elements 101 and together those elements and the module constitute the apparatus 100.

In various embodiments, the pressure sensor 106 and the temperature sensor 108 may be sized and shaped to be suitable to be included within the inlet portion 102 of the apparatus 100. The control module 150 may receive a set point signal indicative of the desired mass flow rate. The control module 150 may use the indicated pressure to determine the actual flow rate based on a historical calibration table for the apparatus 100. The information storage 156 may store the historical calibration table that includes pressure values that may be used to determine the actual flow rate without having to calculate the actual flow rate. Based on the determined pressure, the control module 150 may be capable of changing the actuator 105 to change the pressure through the proportional valve 104. Since the calibration table correlates pressures with flow rates being delivered, the actual flow rate may be adjusted by adjusting the pressure and thereby indirectly adjusting the pressure.

In some embodiments, the pressure-based mass flow apparatus 100 shown in FIG. 1, generates signals indicative of the temperature and pressure of a gaseous fluid and the temperature and the pressure can be used to calculate the indicated flow rate through the fluid pathway based upon pressure through the flow restriction. A variety of control schemes may be used for adjusting the gas flow to bring the indicated flow acceptably close to the desired setpoint. The control module 150 may be located remotely from the module itself whereby those functions are instead performed by other apparatus in a larger system and external to the mass flow controller.

In the embodiments shown in FIG. 1, the gas may flow in through the inlet 102 to the proportional valve 104 that is controlled by the actuator 105. The actuator 105 is configured to adjust in the proportional valve 104 to change the opening of the proportional valve 104. The fluid state sensing mechanism may include a pressure sensor 106 downstream of the proportional value 104 and a temperature sensor 108. The pressure sensor 106 may generate a pressure P1 and generate a signal that represents a pressure to the control module 150 that controls the actuator drive 162 which controls the proportional valve 104 via the actuator 105. The temperature sensor may generate a temperature T1 and generate a signal to the control module that represents a temperature T1 to the control module 150. Next the gas/fluid may pass through a flow restrictor 110 to the outlet 170.

The control module 150 may include a communication interface 154 that receives a signal from external system 152 specifying a set point. The communication interface 154 may communicate with the information storage 156 to determine the appropriate pressure to send to the actuator drive to achieve a set point. The error signal 159 may be determined based on the setpoint from the communication interface 154 and the fluid flow calculation 160 calculations from the information storage 156 and the pressure and temperature from the fluid flow pathway 101.

Figure 2:
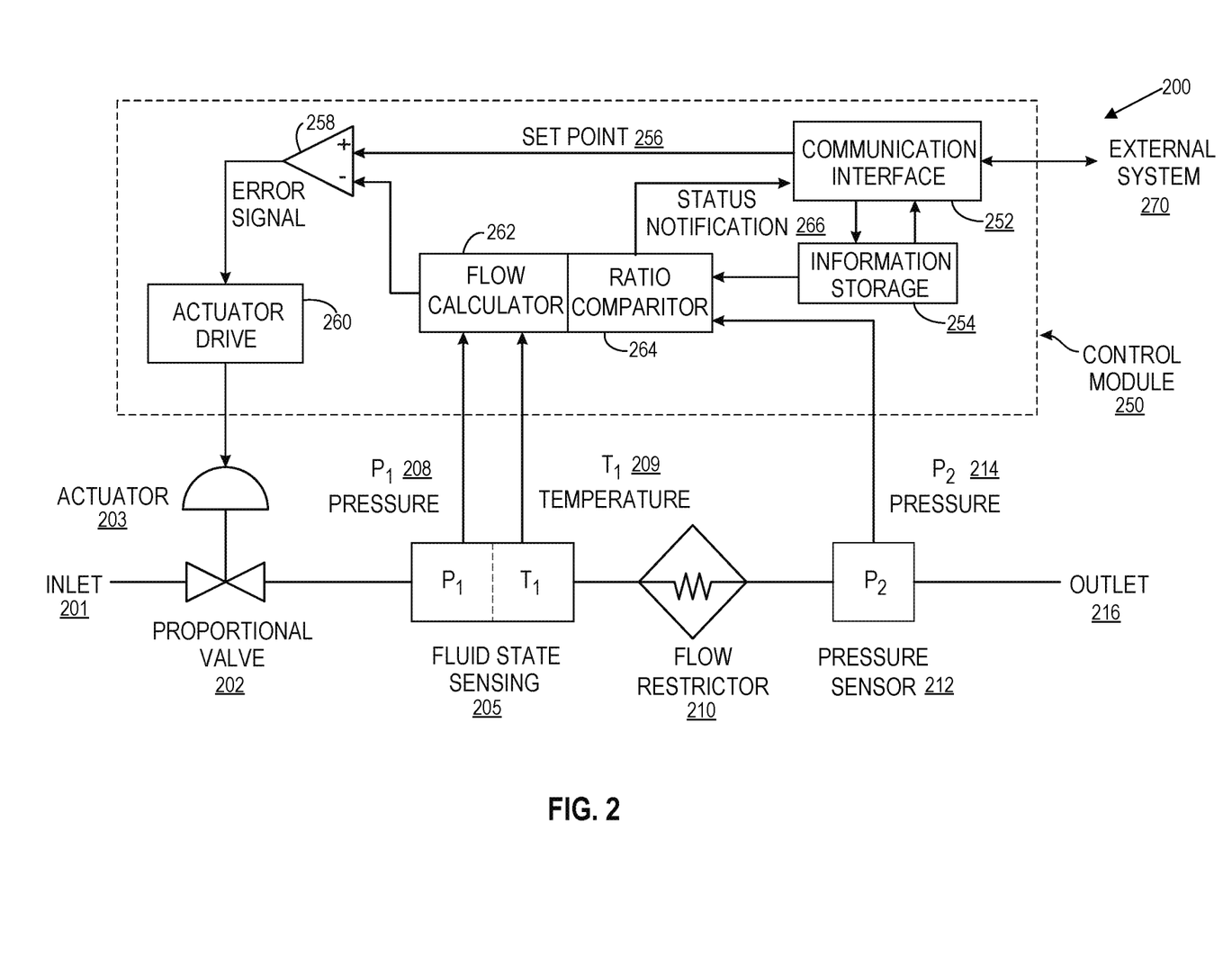
FIG. 2 is a schematic diagram of a flow control system, according to an exemplary embodiment.

Referring to FIG. 2, FIG. 2 illustrates a mass flow control apparatus 200. The mass flow control apparatus 200 includes a flow path that includes an inlet 201, a proportional valve 202, a fluid state sensing sensors (pressure sensor 206 and temperature sensor 207), a flow restrictor 210 and a downstream pressure sensor 212 and outlet 216. The pressure sensor 208 may generate a first signal pressure P1 208 and the temperature sensor 207 may generate a signal temperature T1 209 to send the signals flow calculator 262. A ratio comparator 264 may compare the pressure signal P1 208 compared to pressure signal P2 214.

In various embodiments, another pressure measurement sensor 212 may be added to a mass flow control apparatus 200. The second pressure sensor 212 may be of a differential type used to directly measure the pressure drop across the flow restriction 210. In some embodiments, the second pressure sensor 212 may be an absolute type used to measure the pressure downstream of the flow restrictor 210 and the pressure drop calculated as a difference between the upstream pressure sensor 206 and downstream pressures from pressure sensor 212. Using a differential type sensor across the flow restriction 210 in conjunction with an absolute type measuring the pressure downstream of the flow restrictor 210 may be utilized. The second pressure sensor 212 may conveniently be of size and shape suitable for including it within an outlet 216 portion of the apparatus 200.

The ratio of upstream pressure P1 208 to downstream pressure P2 214 when flow through the orifice or nozzle flow restrictor 210 transitions between choked flow and un-choked flow is often referred to as the critical ratio. The arithmetic inverse is also sometimes called the critical ratio. The specifics of the critical ratio depend upon properties of the gas and whether the flow is considered compressible or incompressible. Minor mechanical details of the restriction opening edges may also affect the onset of empirically observed nonlinearity. The electronic control module 250 may be provided a specific value of critical ratio for a specific gas in the particular fluid flow pathway, or a generalized choice may be made such as considering "two" a suitable critical ratio value. The electronic control module 250 may obtain a critical ratio value derived by the ratio comparator 264 from pressure measurements and compare that obtained value to a stored critical ratio value. When the comparison implies calculation of indicated flow rate may be inaccurate, the control module may send a notification to one or more external devices. The control module 250 may also change the equations or parameters used to calculate the indicated flow.

The control module 250 may include a communication interface 252 that communicates with external system 270 regarding the type of gas/fluid and the set point pressure. The control module 250 may also communication information for storage to the information storage 254. The information storage 254 may also store status notification 266 from the ratio comparator 264 from the differential pressure comparison. The set point 256 may be sent to the error signal generator 258 to determine the actuation on the actuator drive 260 that controls the actuator 203 to control the pressure.

Figure 3:
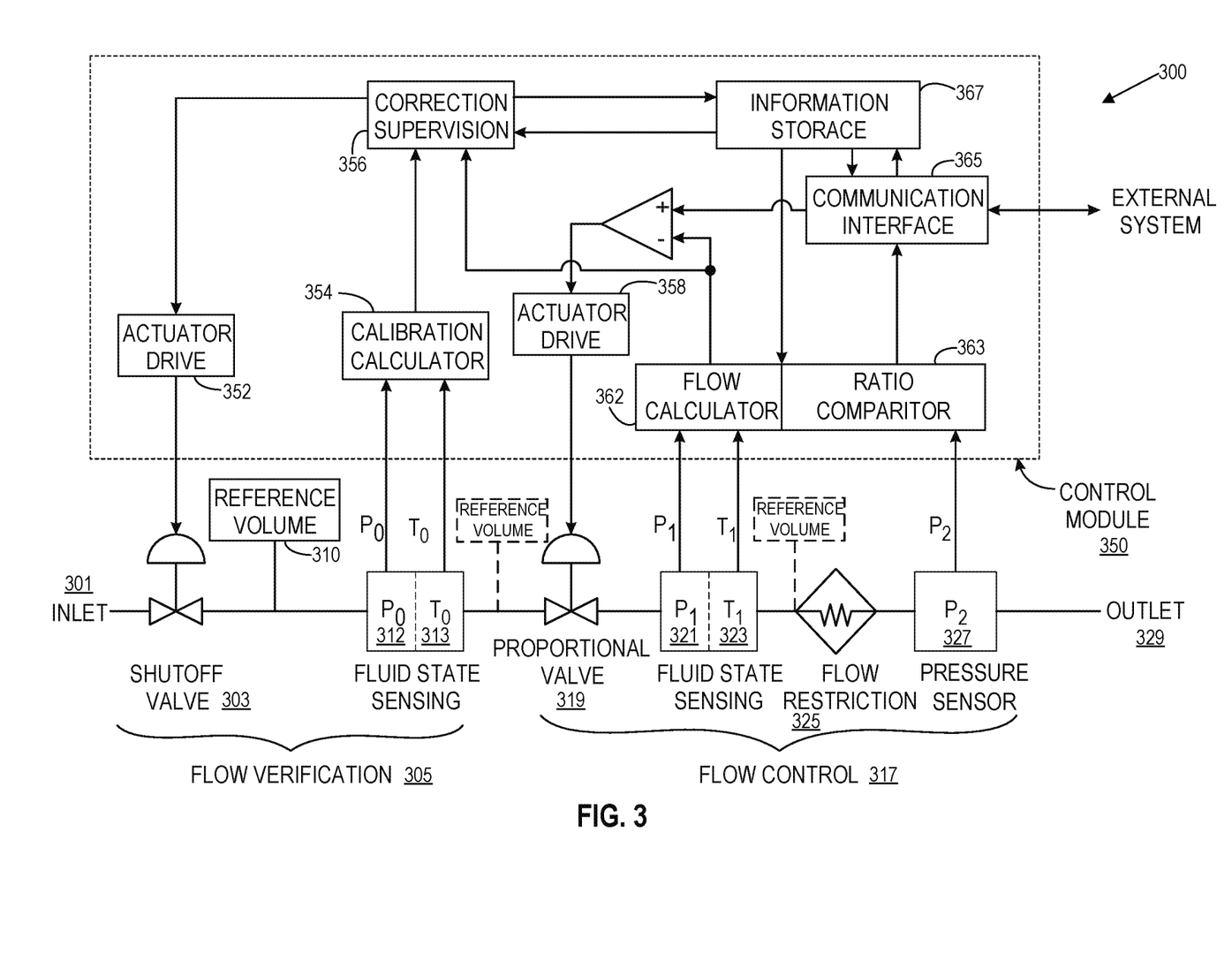
FIG. 3 is a schematic diagram of a flow verification and flow control system, according to an exemplary embodiment.

Referring to FIG. 3, FIG. 3 is a self-correcting pressure-based mass flow control apparatus 300 may comprise a flow control portion 317 and a flow verification portion 305 within the same device or in other embodiments connected or in communication but separate devices. In some embodiments, the flow verification portion 305 may be upstream of the flow control portion 317 because that arrangement makes continuous delivery of fluid/gas to a reaction chamber while flow verification is being performed. A self-correcting fluid mass flow control apparatus 300 includes a fluid pathway comprising an inlet 301, a controllable shutoff valve 303, fluid state sensing apparatus 307 (pressure sensor 312 and temperature sensor 313) provisions for measuring a first temperature and a first pressure of a fluid contained within a reference volume 310 of the fluid pathway, a proportional control valve 319, provisions for measuring a second temperature (using a second temperature sensor 323) and a second pressure (using a second pressure sensor 321) of the fluid contained within the fluid pathway, a flow restrictor 325, provisions for measuring a third pressure (pressure sensor 327) of the fluid contained within the fluid pathway, and an outlet 329. Various other permutations of the above sequence may be possible. The various pressure sensor mentioned herein may be transducers or the like.

The control module 350 includes an actuator drive 352, a calibration calculator 354, a correction supervisor 356, an actuator drive 358, a flow calculator 362, a ratio comparator 363, a communication interface 365, and an information storage 367. The control module 350 may receive the type of gas and the set point flow rate from the external system 331. There may be an electronic control module 350 may be associated with the fluid pathway elements and together those elements and the module constitute the apparatus 300. The pressure sensor 312, 321 and 327 and temperature sensor 313, 323 may be of a size and a shape suitable for inclusion within the general dimensions of the apparatus 300. For example, a pressure sensor 312 may be fit within the inlet portion 301, a second pressure sensor 321 may fit within the reference volume 310, and a third pressure sensor 327 may fit within an outlet 329.

In various embodiments, the control module 350 involves the control module 350 receiving a set point signal indicative of the desired mass flow, determining an indicated flow using signals from the second pressure sensor 321 and the second temperature sensor 323, comparing the indicated flow with the set point, and using a function of that comparison to create a signal to adjust the proportional valve controlling the fluid flow. The flow control portion may use a signal from the third pressure sensor to determine if the indicated flow rate may be inaccurate. Flow verification 305 may include closing the shutoff valve to isolate the fluid pathway from the inlet 301 while controlled mass flow continues through the outlet 327, making repeated measurements of the first temperature T0 and the first pressure P0 of the fluid contained within the reference volume 310 of the fluid pathway for a period of time, opening the shutoff valve to re-establish fluid pathway connection to the inlet 301, calculating a verified flow signal using pressure-temperature-volume methods, and providing the verified flow signal to a correction supervision function in order to activate the actuator drive 358 to adjust the proportional valve 319 and thereby adjusting the pressure P1 to make the flow closer to the flow rate. In some embodiments, the flow restrictor 325 may have proportional valve 319 upstream in the flow path. In some embodiments, the flow restrictor 325 may include a thermal sensor.

Self-correction may be initiated in response to a request received from an external system or initiated by the flow control portion 317 when a possibility of inaccuracy is detected. In either situation, a flow verification is performed to obtain a current verified flow signal while the setpoint remains constant and the corresponding indicated flow rate is obtained. The indicated flow rate is then compared with the verified flow signal. The verified flow signal will not be impacted by variations in downstream pressure and is considered more accurate than the indicated flow rate. Stored coefficients and device configuration information used to calculate the indicated flow rate may be changed by the correction supervisor function within the control module, reported to an external system, or otherwise managed.

The fluid state sensor 307 may include a pressure sensor 312 and temperature sensor 313. The pressure sensor 312 may generate a pressure signal P0 and temperature sensor 313 may generate a pressure signal T0. The pressure signal P0 and temperature signal T0 will be sent to the calibration calculator 354.

In some embodiments, the reference volume 310 may be moved to a downstream location compared to the pressure sensor 312 in the flow path. In other embodiments, the reference volume 310 may be moved to further downstream location to upstream of the proportional valve 319.

Figure 4:
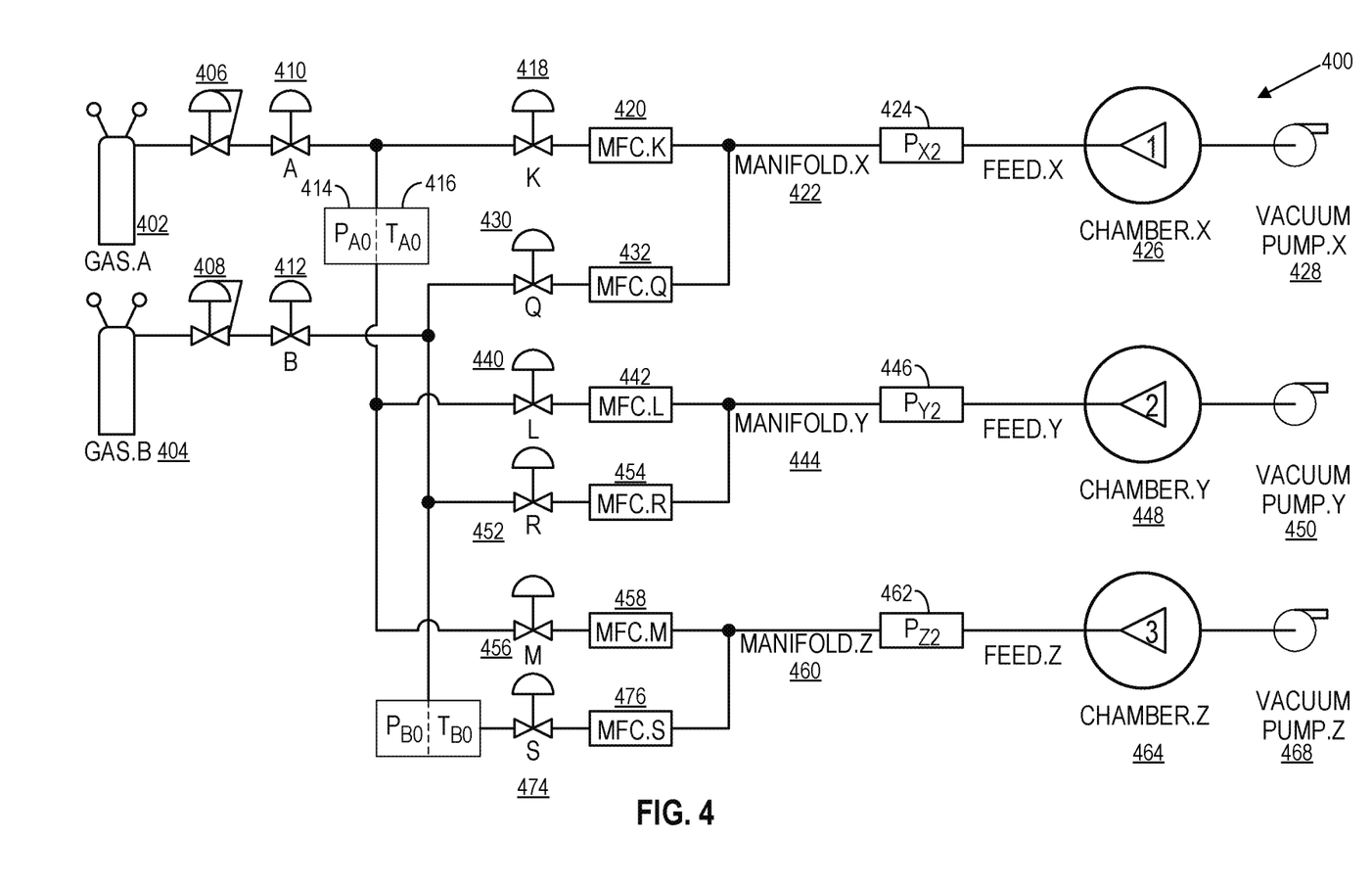
FIG. 4 is a schematic diagram of a flow control system, according to an exemplary embodiment.

Referring to FIG. 4, FIG. 4 shows an apparatus 400 having a plurality of self-correcting mass flow controllers may be used with a plurality of gas species fed to a plurality of vacuum chambers 426, 448, and 464 for processing semiconductor devices within a single large apparatus often referred to as a "tool." A group ("pallet") of mass flow controllers (420, 432, 442, 454, 458, and 476) allow the simultaneous combination of several different gases into a single manifold (442, 444, and 460) which feeds a gas distribution structure ("showerhead") inside a vacuum chamber (426, 448 and 464). Insufficient conductance in the manifold plumbing may result in the downstream pressure, of a particular group of mass flow controllers, becoming too high to maintain choked flow conditions within one or more mass flow controllers within the group. The pressure within the manifold may be monitored using pressure sensor 424, pressure sensor 446 and pressure sensor 462 and a corresponding signal provided to all mass flow controllers within the group as an alternative to each mass flow controller having a separate third pressure sensor. Individual mass flow controller self-correction may then proceed based upon the shared third pressure sensor signal or according to commands emanating from the tool master control (a control system external to the control module of each mass flow controller).

FIG. 4 illustrates an apparatus 400 that includes various system including, a gas provider 402 and a gas provider 404. The apparatus 400 has a plurality of valves, 406, 408, 410, 412, 418, 430, 440, 452, 456, and 474. The apparatus 400 includes one or more pressure sensors to determine the flow rate of the gases. The pressure sensors 414, 416, 424, 446, 462, 470, and 472 may be used to determine the pressure outside of the MFCs 420, 432, 442, 454, 458, and 476.

Figure 5:
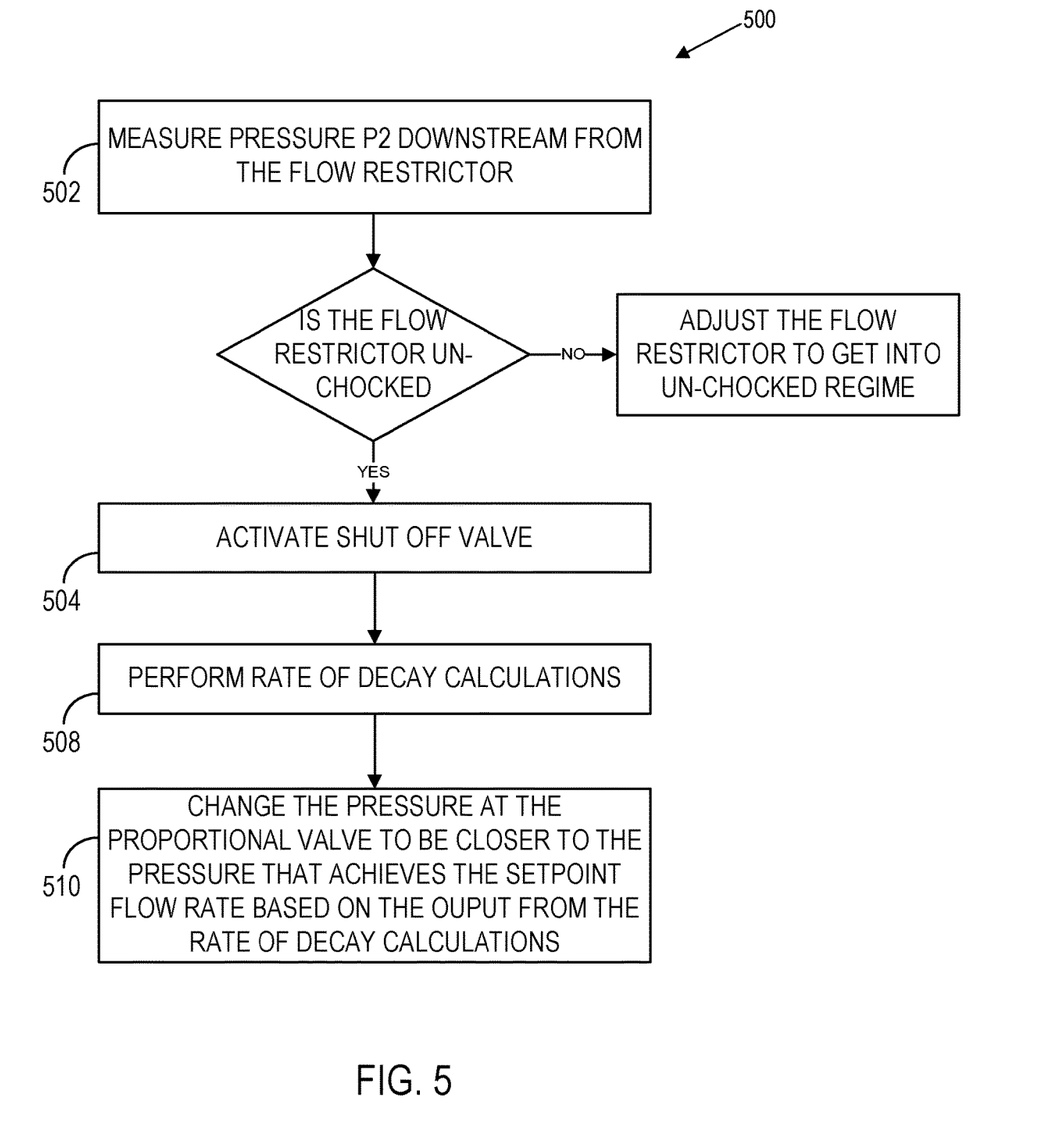
FIG. 5 is flow chart of a method that may be performed by the systems shown in FIGS. 1-4.

Referring to FIG. 5, FIG. 5 shows a process 500 that includes a plurality of steps that may be performed by the systems shown in FIGS. 1-4. At step 502, a pressure sensors 327 may be configured to measure the pressure. The pressure sensor 327 may measure the pressure downstream from the flow restrictor to confirm that the flow restrictor 325 is operating in an un-choked condition upstream from the outlet 329. If the flow restrictor is operating in an un-choked condition, the shutoff valve 303 may be activated in step 504. After activating the shut off valve a rate of decay calculation may be performed using the pressure and temperatures in the flow path in step 506. Based on the output from the rate of decay adjust the proportional valve 319 to achieve the flow rate based on the pressure toward a set point number in a look up table in step 510. The rate of decay calculation may determine an actual flow rate and the flow controller apparatus may compare the actual flow rate to the set point flow rate. Based on the comparison mentioned above, the pressure at after the proportional valve may be adjusted to the pressure that closer corresponds to the set point flow rate. In various embodiments, calculating the rate of decay is known. However, unlike those patents, the rate of decay measurement here is triggered by measuring the pressure downstream from the flow restrictor (orifice) and only the pressure is adjusted by the proportional valve.

Various embodiments disclosed herein are not directed to performing continuous delivery of gas and instead operate in a batch wise delivery of gas. The apparatus must activate the shutoff valve and then perform a rate of decay using the reference volume to keep the gas temperature constant to determine an actual flow rate.

An apparatus for reference volume measurements, comprising: a reference volume chamber, an interior region of the reference volume chamber comprising of an inlet portion, a bottom portion, a finned structured side wall and a central wall, that defines a fluid boundary for a fluid pathway for a fluid, entering through the inlet portion, sensed via a transducer element mounted orthogonal to the fluid pathway and exiting through the outlet portion of the reference volume chamber.

Having thus described several aspects of at least various embodiments of this system, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for controlling a mass flow control apparatus, the method comprising:
   measuring a first pressure using a first pressure sensor of a fluid in a flow path downstream to a flow restrictor;
   activating a shutoff valve in the flow path upstream from the flow restrictor;
   performing a rate of decay measurement in the flow path using a reference volume which is upstream to the flow restrictor;
   responsive to the results of the rate of decay measurement, adjusting a second pressure, that is measured using a second pressure sensor upstream to the flow restrictor, by using a proportional valve to achieve an actual flow rate that is closer to a received setpoint flow rate;
   determining that an indicated flow rate from the second pressure is inaccurate, which is based on the rate of decay measurement which represents the actual flow rate; and
   changing, responsive to determining that the indicated flow rate is inaccurate, an equation used to determine the indicated flow rate to more closely match the actual flow rate;
   determining, based on a ratio of the first pressure to the second pressure across the flow restrictor, that a flow of the fluid through the flow path changed from choked to un-choked or changed from un-choked to choked; and changing, responsive to determining the change from choked to un-choked or unchoked to choked, the equation used to determine the indicated flow rate.

2. The method of claim 1, further comprising determining the actual flow rate based on the rate of decay measurement.

3. The method of claim 1, wherein the reference volume that is downstream to the shutoff valve corresponds to the pressure at the second pressure sensor.

4. The method of claim 1, wherein the proportional valve is a control valve that controls a pressure to the flow restrictor.

5. The method of claim 1, wherein the flow path comprises the shutoff valve, the reference volume, and the proportional valve, wherein the proportional valve is configured to control the second pressure to the flow restrictor with numerous pressure transducers in the flow path.

6. The method of claim 1, wherein the first pressure is an absolute pressure upstream of the flow restrictor and the second pressure is an absolute pressure downstream of the flow restrictor.

7. The method of claim 1, further comprising performing the rate of decay measurement in a batchwise process instead of a continuous flow process by using the rate of decay measurement from a historical measurement for further flow of fluid.

8. A mass flow controller apparatus, the apparatus comprising:
   a first pressure sensor configured to measure a first pressure of a fluid in a flow path downstream to a flow restrictor;
   a shutoff valve in the flow path upstream from the flow restrictor to perform a rate of decay measurement in the flow path using a reference volume that is upstream to the flow restrictor;
   a second pressure sensor configured to measure a second pressure of the fluid in the flow path upstream to the flow restrictor;
   a proportional valve configured to be responsive to the results of the rate of decay measurement, the proportional value configured to adjust the second pressure at the second pressure sensor upstream to the flow restrictor to achieve an actual flow rate that is closer to a received setpoint flow rate;
   a controller configured to determine that the rate of decay measurement is inaccurate based on a measurement of the actual flow rate responsive to the second pressure; and
   the controller further configured to change an equation used to determine the rate of decay measurement to more closely match the actual flow rate responsive to the determination that the rate of decay measurement is inaccurate;
   the controller further configured to determine, that a flow of the fluid through the flow path changed from choked to un-choked or changed from un-choked to choked, based on a ratio of the first pressure to the second pressure; and
   the controller further configured to change the equation used to determine the rate of decay measurement, responsive to determining the change from choked to un-choked or unchoked to choked.

9. The apparatus of claim 8, wherein the rate of decay measurement allows the mass flow controller to determine the actual flow rate.

10. The apparatus of claim 8, wherein the reference volume is a calibration volume.

11. The apparatus of claim 8, wherein the reference volume that is downstream to the shutoff valve corresponds to the second pressure at the second pressure sensor.

12. The apparatus of claim 8, wherein the proportional valve is a control valve that controls a pressure to the flow restrictor.

13. The apparatus of claim 8, wherein the flow path comprises the shutoff valve, the reference volume, and the proportional valve, wherein the proportional valve is configured to control the second pressure to the flow restrictor with numerous pressure transducers in the flow path.

14. The apparatus of claim 8, wherein the first pressure is an absolute pressure upstream of the flow restrictor and the second pressure is an absolute pressure downstream of the flow restrictor.

15. The apparatus of claim 8, further comprising performing the rate of decay measurement in a batchwise process instead of a continuous flow process by using the rate of decay measurement from a historical measurement for further flow of fluid.

16. A mass flow control apparatus comprising:
   a first pressure measuring sensor in fluid communication with a reference volume in a fluid pathway,
   a first temperature measuring sensor providing a temperature signal indicative of a fluid temperature within the reference volume,
   a second pressure measuring sensor in fluid communication with the fluid pathway,
   a second temperature measuring sensor providing a temperature signal indicative of a fluid temperature within the fluid pathway,
   a third pressure measuring sensor in fluid communication with a third location in the fluid pathway, and
   an electronic control module receptive to a first signal from the second pressure measuring sensor, and receptive to a second signal from the third pressure measuring sensor, the electronic control module further comprising:
   a control algorithm executing processor calculating a ratio of a pressure upstream of a flow restriction in the fluid pathway to a pressure downstream of the flow restriction, and at least one communication means,
   wherein the control algorithm executing processor uses the at least one communication means to send an algorithm status notification based upon comparing the ratio to a predetermined value obtained from a storage means; and
   wherein the control algorithm executing processor, responsive to the algorithm status notification, changes an equation used to calculate a determined flow rate.

17. The method of claim 1, further comprising comparing the ratio to a critical value; and
   wherein responsive to the comparing, a shutoff valve in the flow path is activated and the rate of decay measurement is performed.

18. The method of claim 17, further comprising sending a notification responsive to the comparing.

* * * * *